(12) United States Patent
Sobolik

(10) Patent No.: US 6,293,475 B1
(45) Date of Patent: Sep. 25, 2001

(54) FOLDABLE BOOM FOR AN AGRICULTURAL SPRAYER

(75) Inventor: David J. Sobolik, Devils Lake, ND (US)

(73) Assignee: Summers Manufacturing Co., Inc., Devils Lake, ND (US)

( * ) Notice: Subject to any disclaimer, the term of this patent is extended or adjusted under 35 U.S.C. 154(b) by 0 days.

(21) Appl. No.: 09/494,571

(22) Filed: Jan. 31, 2000

(51) Int. Cl.[7] .................................................. B05B 1/20
(52) U.S. Cl. ........................ 239/168; 239/159; 239/166; 239/167; 239/728; 239/739
(58) Field of Search ........................... 239/159, 166–168, 239/172, 722, 728, 739, 753

(56) References Cited

U.S. PATENT DOCUMENTS

| | | | |
|---|---|---|---|
| 4,288,034 | * | 9/1981 | Widmer et al. ................... 239/168 |
| 4,427,154 | * | 1/1984 | Mercil ............................. 239/167 |
| 5,957,383 | * | 9/1999 | Benest ............................ 239/166 |
| 5,988,528 | * | 11/1999 | Krohn et al. .................... 239/168 |
| 6,027,039 | * | 2/2000 | Mercil ............................. 239/166 |
| 6,059,201 | * | 5/2000 | Weddle ........................... 239/159 |
| 6,119,963 | * | 9/2000 | Bastin et al. .................... 239/168 |

OTHER PUBLICATIONS

Brochure, Bestway; 2000 Spray Equipment, 2000.
Brochure, Flexi–Coil; 67 Series Sprayers; Suspended Boom, 1999.
Brochure, Hardi, Inc.; Performance Above & Beyond (Series of Trailer Sprayers); Commander.
Web–site information, RHS, Inc.; Dealer Locator, Bestway: Comparing the Field–Pro Sprayers, Mar. 15, 2000.
Brochure, Redball; 680 High Clearance Sprayers.
Brochure, Spray–Air USA Inc.; 2200 Series (High Clearance–Pull Type).

* cited by examiner

*Primary Examiner*—David A. Scherbel
*Assistant Examiner*—Dinh Q. Nguyen
(74) *Attorney, Agent, or Firm*—Merchant & Gould P.C.

(57) ABSTRACT

The present disclosure relates to a folding boom for an agricultural sprayer. The boom includes a first piece pivotally connected to a second piece. The folding boom also includes a hydraulic cylinder for hydraulically pivoting the first boom piece relative to the second boom piece between a folded orientation and an extended orientation. The hydraulic cylinder includes a cylinder portion in which a piston structure is mounted. The cylinder portion and the piston structure are configured to slide axially relative to one another when the first boom piece is pivoted relative to the second boom piece. The folding boom further includes an accumulator in fluid communication with the cylinder portion for accumulating hydraulic fluid when the first boom piece collides with an obstruction and is pivoted from the extended orientation toward the folded orientation.

16 Claims, 16 Drawing Sheets

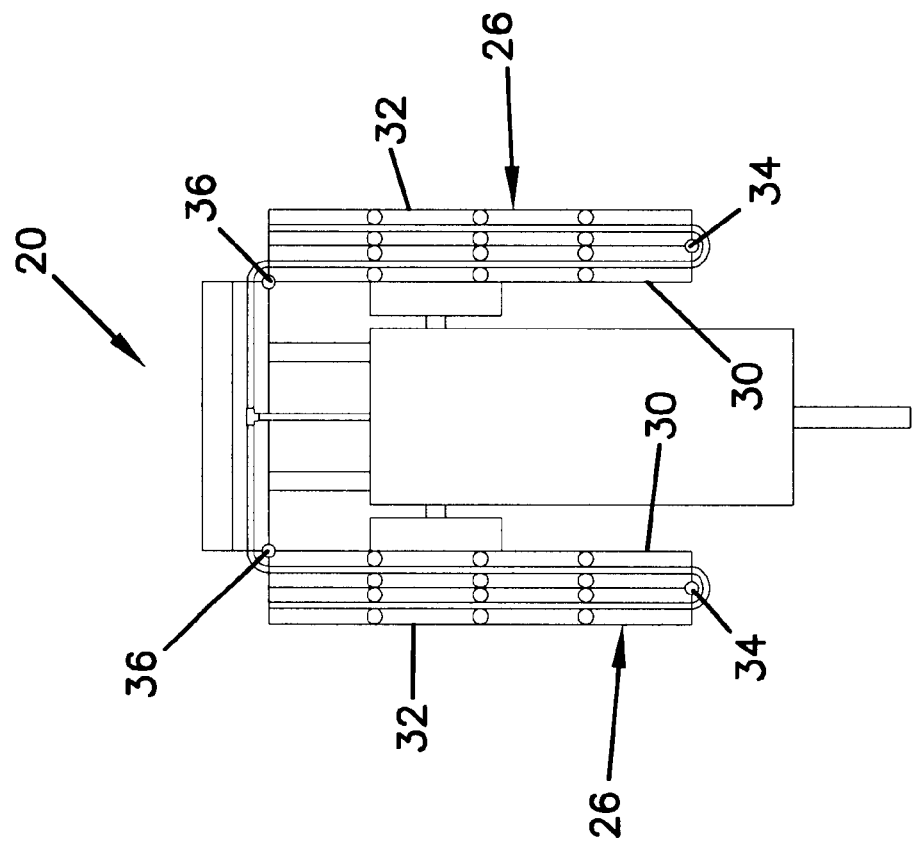

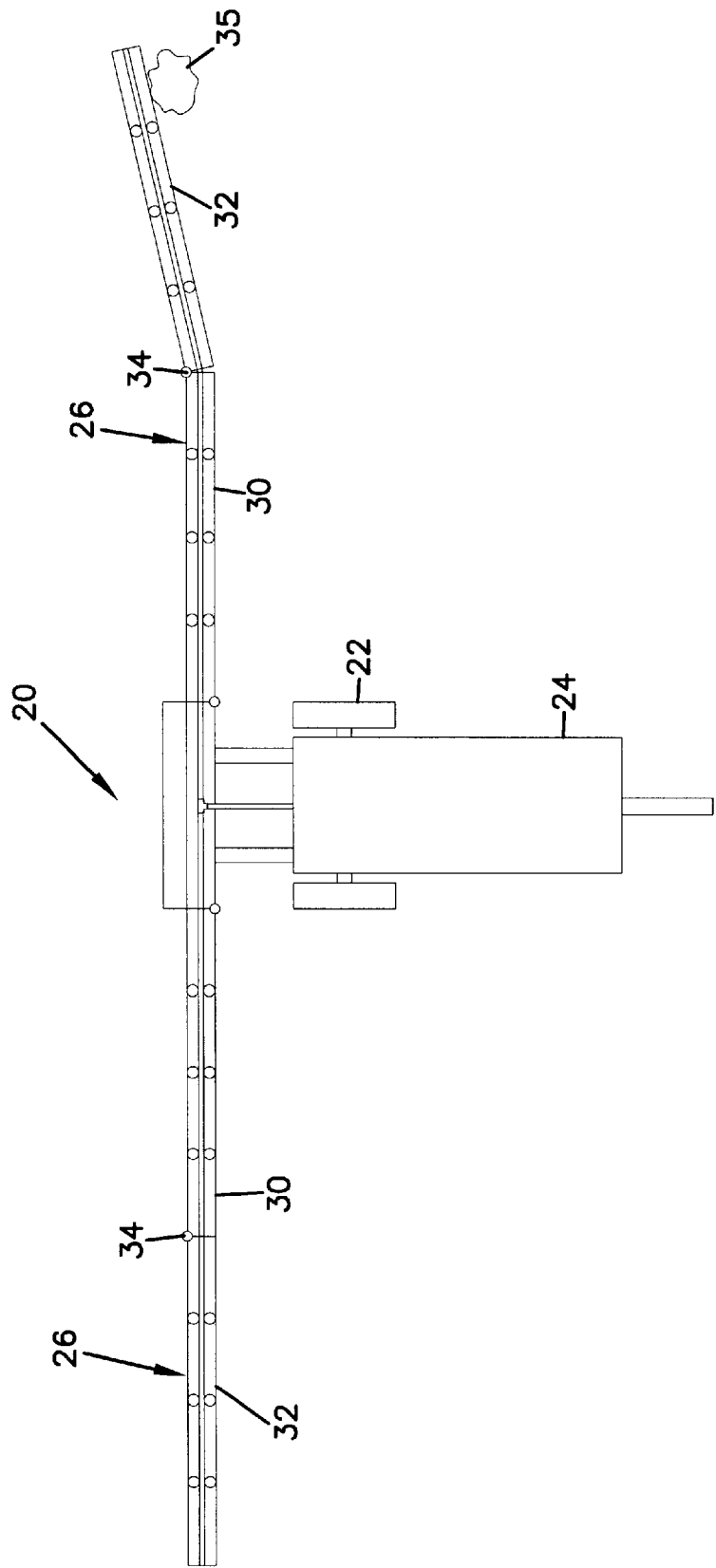

FOLDABLE BOOM FOR AN AGRICULTURAL SPRAYER

FIELD OF THE INVENTION

The present invention relates generally to agricultural sprayers. More particularly, the present invention relates to agricultural sprayers having booms that can be hydraulically folded and unfolded.

BACKGROUND OF THE INVENTION

Farmers are increasingly recognizing the need for spraying in their farming operations. For example, many farmers now spray herbicides for controlling weeds in the early growing season, and then later spray fungicides or insecticides during the later growing seasons.

High clearance type sprayers have a variety of configurations such as self propelled sprayers, truck mounted sprayers, tractor mounted sprayers, and pull-type sprayers. A typical sprayer includes a tank for holding a product desired to be sprayed, and a plurality of spray nozzles for dispensing the product from the tank. The spray nozzles are mounted on extended booms that project outward from opposite sides of the tank. It is common for each boom to have a length in the range of 60 to 120 feet. Hydraulic cylinders are commonly used to raise and lower the clearance height of the booms. Hydraulic cylinders are also commonly used to fold the booms for transport and storage, and to unfold the booms prior to conducting spraying operations.

SUMMARY OF THE INVENTION

One aspect of the present invention relates to an agricultural sprayer including a tank for holding a product desired to be sprayed, and a boom on which are mounted a plurality of sprayers (e.g., spray nozzles) for dispensing the product from the tank. The boom includes an inner piece positioned adjacent to the tank and an outer piece positioned away from the tank. The inner and outer pieces are foldably connected to one another at a pivot region. The sprayer also includes a hydraulic cylinder for hydraulically folding and unfolding the inner and outer pieces of the boom, and a pressure source (e.g., a pump or hydraulic pressure from a vehicle hydraulic system) for providing hydraulic pressure to the hydraulic cylinder. The hydraulic cylinder includes a piston structure connected to one of the inner and outer pieces of the boom and a cylinder portion connected to the other of the inner and outer pieces of the boom. A hydraulic control system is provided for controlling the operation of the cylinder. The hydraulic control system is operable in an unfold mode in which hydraulic pressure from the pressure source causes the hydraulic cylinder to unfold the inner and outer pieces of the boom, and a fold mode in which hydraulic pressure from the pressure source causes the hydraulic cylinder to fold the inner and outer pieces of the boom. The hydraulic control system is also operable in a neutral mode in which fluid communication is blocked between the pressure source and the cylinder. The hydraulic control system includes a hydraulic circuit configured for allowing relative axial movement between the piston structure and the cylinder portion of the hydraulic cylinder when the hydraulic control system is operating in the neutral mode. The relative mobility of the piston structure and the cylinder portion when the hydraulic control system is in the neutral mode allows the outer piece of the boom to fold back relative to the inner piece of the boom upon contact with an obstruction.

Another aspect of the present invention relates to a folding boom for an agricultural sprayer. The boom includes a first boom piece pivotally connected to a second boom piece. The folding boom also includes a hydraulic cylinder for hydraulically pivoting the first boom piece relative to the second boom piece between a folded orientation and an extended orientation. The hydraulic cylinder includes a cylinder portion in which a piston structure is mounted. The cylinder portion and the piston structure are configured to slide axially relative to one another when the first boom piece is pivoted relative to the second boom piece. The folding boom further includes an accumulator in fluid communication with the cylinder portion for accumulating hydraulic fluid when the first boom piece collides with an obstruction and is pivoted from the extended orientation toward the folded orientation.

A further aspect of the present invention relates to a method for providing a break-away function in a foldable agricultural spraying boom. The boom includes a first boom piece pivotally connected to a second boom piece. The boom also includes a hydraulic cylinder for hydraulically pivoting the first boom piece relative to the second boom piece between folded and extended positions. The hydraulic cylinder includes a piston structure mounted within a cylinder portion. The piston structure and the cylinder portion are configured to slide axially relative to one another when the first boom piece is pivoted between the folded and extended positions. The method includes contacting the first boom piece with an obstruction such that a force is applied to the first boom piece that pushes the first boom piece in a direction from the extended position toward the folded position. The method also includes transferring the force from the first boom piece to the hydraulic cylinder. The method further includes sliding the piston structure and the cylinder portion axially relative to one another in response to the force transferred to the hydraulic cylinder through the first boom piece. The relative axial movement of the piston structure and the cylinder portion allows the first boom piece to pivot toward the folded position until the obstruction is bypassed.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows:

FIG. 2B illustrates the agricultural sprayer of FIG. 1 with the inner and outer boom pieces folded for transportation/storage;

FIG. 3 shows the agricultural sprayer of FIG. 1 with the outer piece of the right boom experiencing a break-away condition;

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
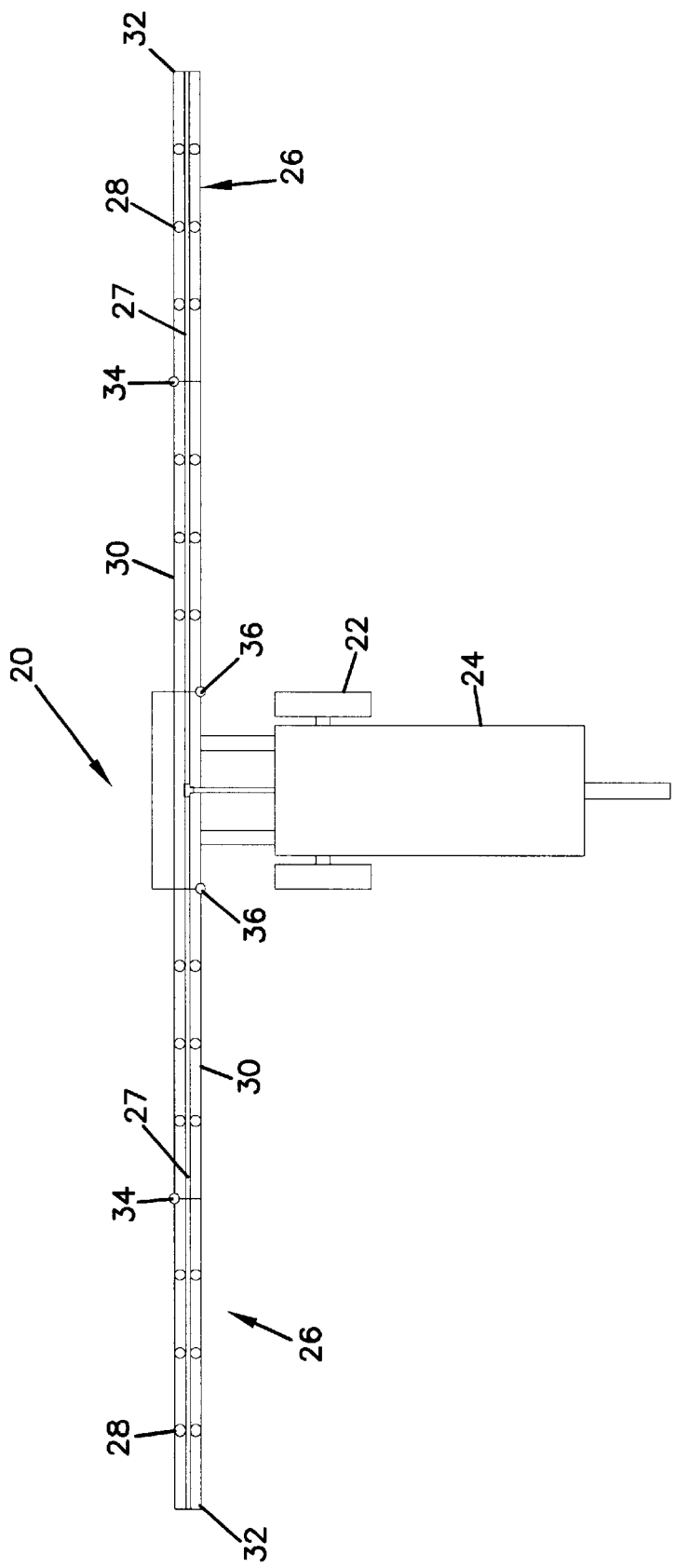
FIG. 1 is a schematic plan view of a pull-type agricultural sprayer constructed in accordance with the principles of the present invention, left and right booms (each having inner and outer boom pieces) of the sprayer are shown extended.

FIG. 1 illustrates a pull-type agricultural sprayer 20 constructed in accordance with the principles of the present invention. The sprayer 20 includes a trailer 22 on which a tank 24 is supported. The tank 24 is adapted for holding any number of different types of products desired to be sprayed such as insecticides, pesticides, herbicides, fungicides, fertilizers, etc. The sprayer 20 also includes left and right booms 26 positioned on opposite sides of the tank 24. A plurality of spray nozzles 28 for dispensing the product from the tank 24 are mounted on the booms 26. Conduits 27 (e.g., pipes or tubes) are used to convey the product from the tank 24 to the spray nozzles 28. Each of the booms 26 includes an inner boom part 30 pivotally connected to an outer boom part 32 at an intermediate pivot location or region 34. The pivot locations 34 allow each set of inner and outer boom parts 30 and 32 to be relatively pivoted between an extended orientation (shown in FIG. 1) and a folded orientation shown in FIG. 2A). The inner boom parts 32 are pivotally connected to the trailer 22 at inner pivot locations 36. The intermediate and inner pivot locations 34 and 36 allow the booms 26 to be moved (i.e., pivoted or folded) to a stowed orientation (shown in FIG. 2B) for transport and storage.

The sprayer 20 includes a break-away structure for preventing the booms 26 from becoming damaged (e.g., bent or broken) if either of the booms 26 contacts an obstruction. For example, if either of the outer boom parts 32 contacts an obstruction during a spraying operation, the agricultural sprayer 20 is adapted to allow the outer boom parts 32 to pivot backward relative to the inner boom parts 30 until the obstacle is bypassed. FIG. 3 shows one of the outer boom parts 32 experiencing a break-away condition. As shown in FIG. 3, the outer boom part 30 is engaging an obstacle 35 (e.g., a rock, fence post, etc.) and is in the process of being pivoted about the intermediate pivot location 34 from the extended orientation toward the folded orientation.

Figure 4:
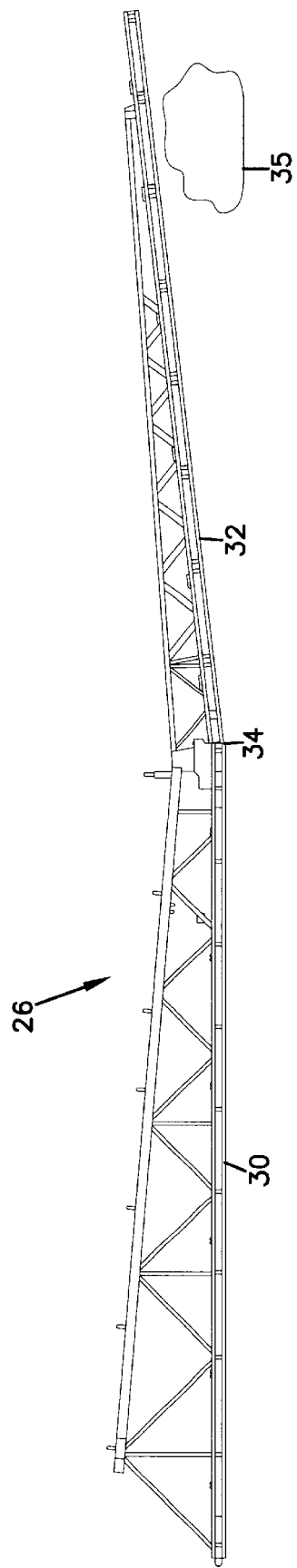
FIG. 4 is a front view of the right boom of FIG. 3 that is experiencing the break-away condition.
Figure 5:
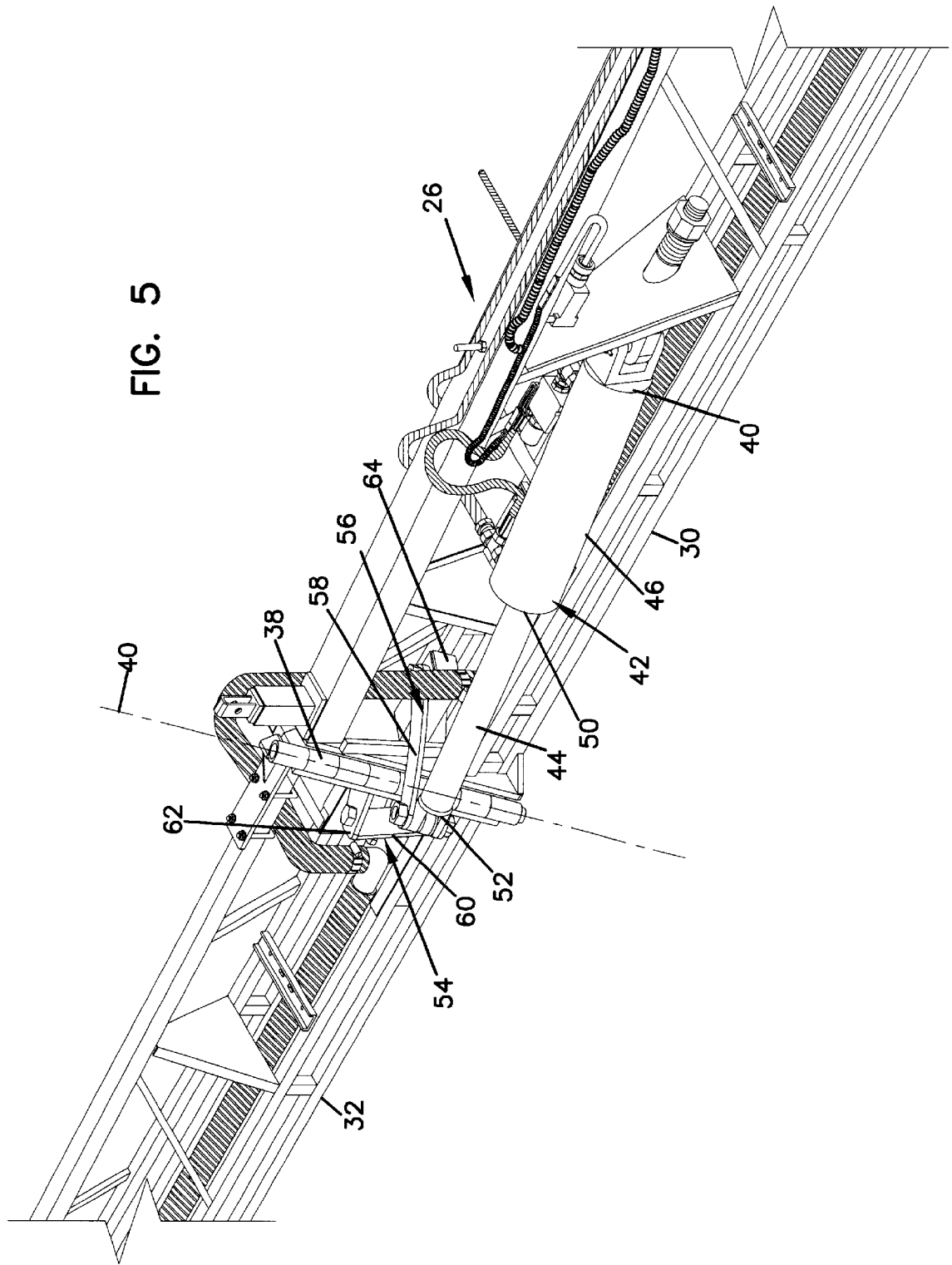
FIG. 5 is a rear perspective view of a hinge region between inner and outer extensions of one of the booms of the agricultural sprayer of FIG. 1.

FIG. 5 is a rear perspective view of the intermediate pivot location 34 of one of the booms 26. It will be appreciated that the depicted intermediate pivot location 34 is representative of the pivot structure configuration used by both of the booms 26. The intermediate pivot location 34 includes a hinge 38 that pivotally connects the inner boom part 30 to the outer boom part 32. The hinge 38 has a pivot axis 40 that is angled slightly forward relative to vertical. The alignment of the pivot axis 40 allows the outer boom part 32 to pivot rearwardly and upwardly relative to the inner boom part 30 upon contact with an obstacle. For example, FIG. 4 shows a front view of the right boom 26 during a break-away condition. As shown in FIG. 4, the outer boom part 32 moves upward away from the ground as the outer boom part 32 is pivoted from the extended orientation toward the folded orientation.

Figure 2A:
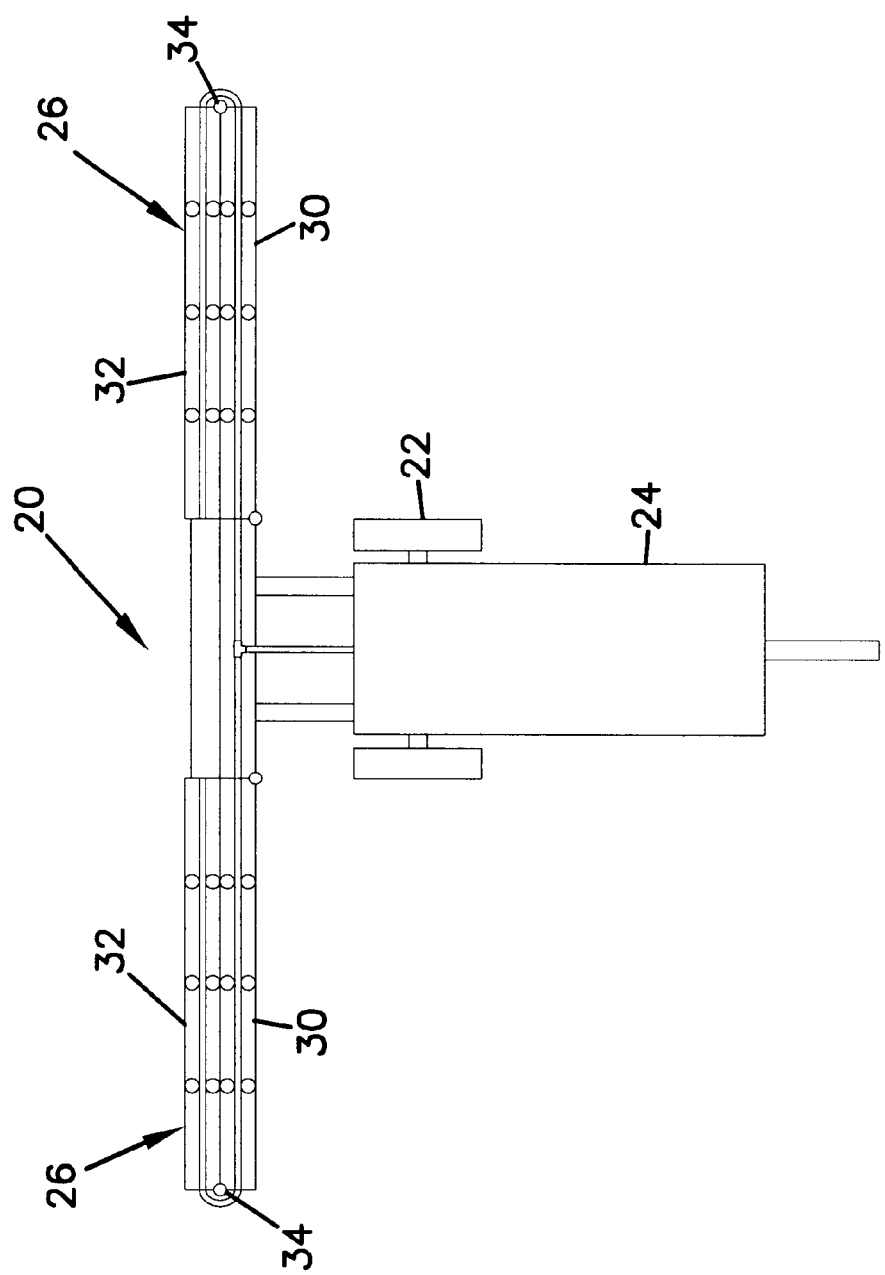
FIG. 2A illustrates the agricultural sprayer of FIG. 1 with the outer boom pieces folded at intermediate pivot locations.

Still referring to FIG. 5, the depicted boom 26 includes a hydraulic cylinder 42 for hydraulically moving the inner and outer boom parts 30 and 32 between the extended orientation (shown in FIG. 1) and the folded orientation (shown in FIG. 2A). The hydraulic cylinder 42 includes a piston structure 44 that is reciprocally mounted within a cylinder portion 46. A blind end 48 (i.e., the base end) of the cylinder portion 46 is pivotally connected to the inner boom part 30. The piston structure 44 extends through an open end 50 (i.e., the rod end) of the cylinder portion 46.

Figure 6:
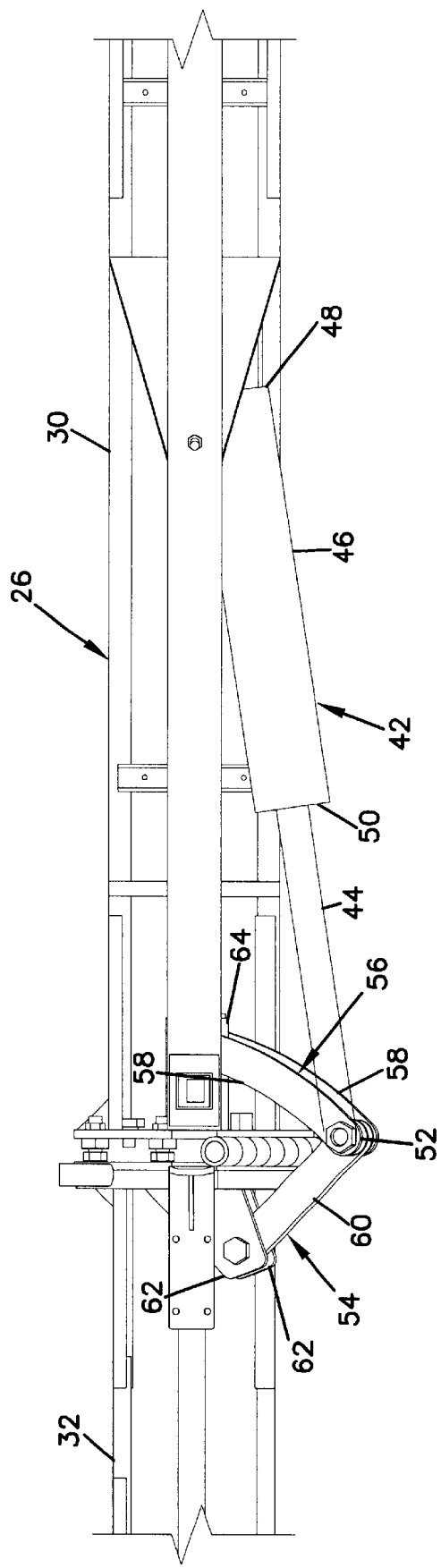
FIG. 6 is a top view of the hinge region of FIG. 5.
Figure 7:
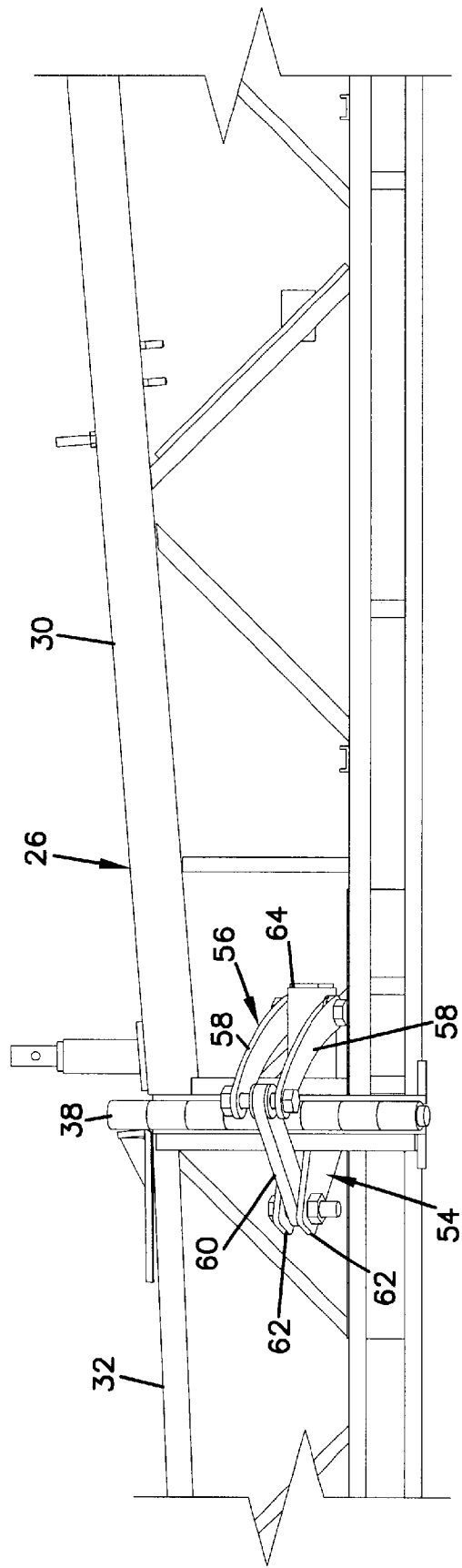
FIG. 7 is a rear view of the hinge region of FIG. 5 in which the hydraulic cylinder has been removed for clarity.

As shown in FIGS. 5–7, a free end 52 of the piston structure 44 is pivotally connected to the outer boom part 32 by a first linkage 54, and is connected to the inner boom part 30 by a second linkage 56. The first linkage 54 includes a link member 60 having one end pivotally connected to the free end 52 of the piston structure 44, and a second end pivotally connected between two plates 62. The plates 62 have base ends that are fixedly connected to the outer boom parts 32. The second linkage 56 includes two spaced-apart link members 58 positioned above and below the link member 60 of the first linkage 54. The link members 58 of the second linkage 56 have first ends pivotally connected to the free end 52 of the cylinder portion 46, and second ends pivotally connected to a block 64 that is fixedly connected to the inner boom part 30.

FIGS. 8A–8E schematically illustrate a hydraulic control system 70 constructed in accordance with the principles of the present invention. The depicted hydraulic control system 70 is shown providing an interface between a hydraulic power system 71 and one of the hydraulic cylinders 42. For ease of explanation, only one of the hydraulic cylinders 42 is shown in FIGS. 8A–8E. However, it will be appreciated that a similar control system is preferably used to concurrently control hydraulic cylinders 42 located at the intermediate pivot locations 34 of both of the booms 26.

Typically, the hydraulic power system 71 will be provided as part of a vehicle (e.g., a tractor 71') used to pull or otherwise move the sprayer 20. As shown in FIGS. 8A–8E, the hydraulic power system 71 includes a pump 72, a reservoir 100 for storing hydraulic fluid (e.g., oil) and a main valve 98 (e.g., a solenoid valve or other type of device for controlling flow). The main valve 98 opens and closes fluid communication between the pump 72 and the hydraulic control system 70, and also opens and closes fluid communication between the reservoir 100 and the hydraulic control system 70.

Figure 8A:
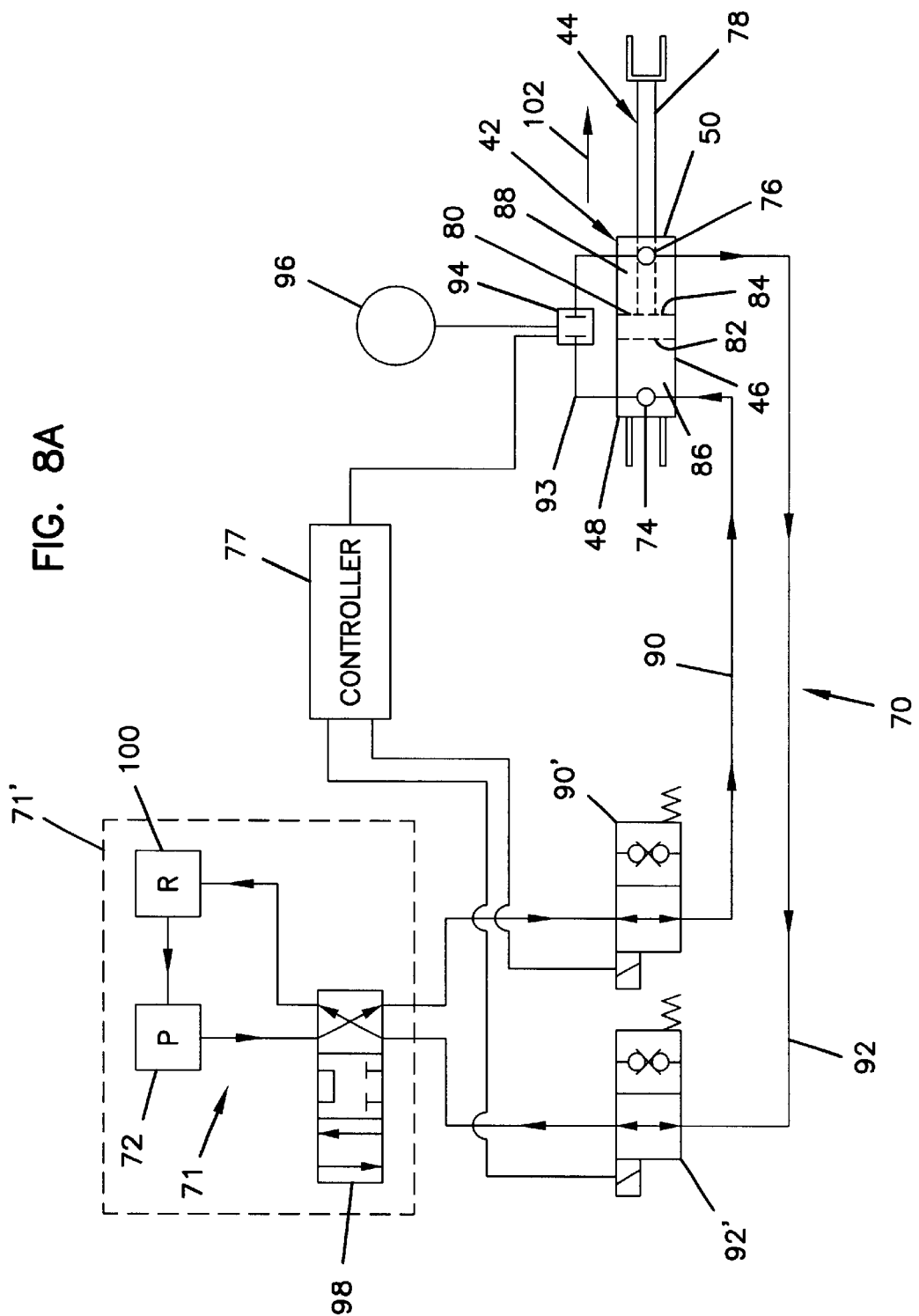
FIG. 8A is a schematic diagram of a hydraulic control system suitable for use with the agricultural sprayer of FIG. 1, the hydraulic control system is shown to in an extend mode.

Referring now to FIG. 8A, the cylinder portion 46 of the depicted hydraulic cylinder 42 is shown including a first port 74 positioned adjacent the blind end 48 of the cylinder portion 46, and a second port 76 positioned adjacent to the open end 50 of the cylinder portion 46. The piston structure 44 of the hydraulic cylinder 42 is shown including a piston rod 78 connected to a piston head 80. The piston head 80 includes a first axial side 82 that faces toward the blind end 48 of the cylinder portion 46, and a second axial side 84 that faces toward the open end 50 of the cylinder portion 46. The piston rod 78 is connected to the second axial side 84 of the piston head 80. A first chamber 86 is defined within the cylinder portion 46 adjacent the first axial side 82 of the piston head 80, and a second chamber 88 is defined within the cylinder portion 46 adjacent the second axial side 84 of the piston head 80. The first port 74 is in fluid communication with the first chamber 86, and the second port 76 is in fluid communication with the second chamber 88.

The hydraulic control system 70 includes a hydraulic circuit (i.e., one or more hydraulic flow pathways or passages) that directs hydraulic fluid toward and away from the hydraulic cylinder 42. The hydraulic circuit includes a first flow line 90 that is in fluid communication with the first port 74 of the hydraulic cylinder 42, and a second flow line 92 that is in fluid communication with the second port 76 of the hydraulic cylinder 42. Valves 90' and 92' respectively control flow through the first and second flow lines 90 and 92. The hydraulic circuit also includes a bypass flow line 93 that bypasses the piston head 80 and provides fluid communication between the first and second ports 74 and 76. A blocking valve 94 is provided for selectively opening and closing fluid flow through the bypass flow line 93. The hydraulic control system 70 further includes an accumulator 96 that is selectively placed in fluid communication with the bypass flow line 93. A controller 77 (e.g., a mechanical controller, an electronic controller, a software driven controller, etc.) can be used to control the operation of the blocking valve 93, the first flow line valve 90' and the second flow line valve 92'.

Referring still to FIGS. 8A–8E, the main valve 98 is movable between a first position (shown in FIG. 8A) corresponding to an extend mode of the hydraulic cylinder 42, a second position (shown in FIG. 8B) corresponding to a fold mode of the hydraulic control system 70, and a neutral position (shown in FIG. 8C) corresponding to a neutral mode of the hydraulic control system 70. When the hydraulic flow system 70 is in the extend mode of FIG. 8A, the pump 72 pumps hydraulic fluid (e.g., hydraulic oil) from the storage reservoir 100 through the first flow line 90 toward the first chamber 86. The pressurized fluid entering the first chamber 86 causes the hydraulic cylinder 42 to extend (i.e., the piston structure 44 slides in a rightward direction as indicated by arrow 102). As the hydraulic cylinder 42 extends, hydraulic fluid within the second chamber 88 is forced into the second flow line 92 and flows in a direction toward the reservoir 100. During the extension process, the blocking valve 94 prevents fluid flow through the bypass flow line 93. The extension of the hydraulic cylinder 42 causes the inner and outer boom parts 30 and 32 of its corresponding boom 26 to pivot from the folded orientation of FIG. 2A toward the extended orientation of FIG. 1.

Figure 8B:
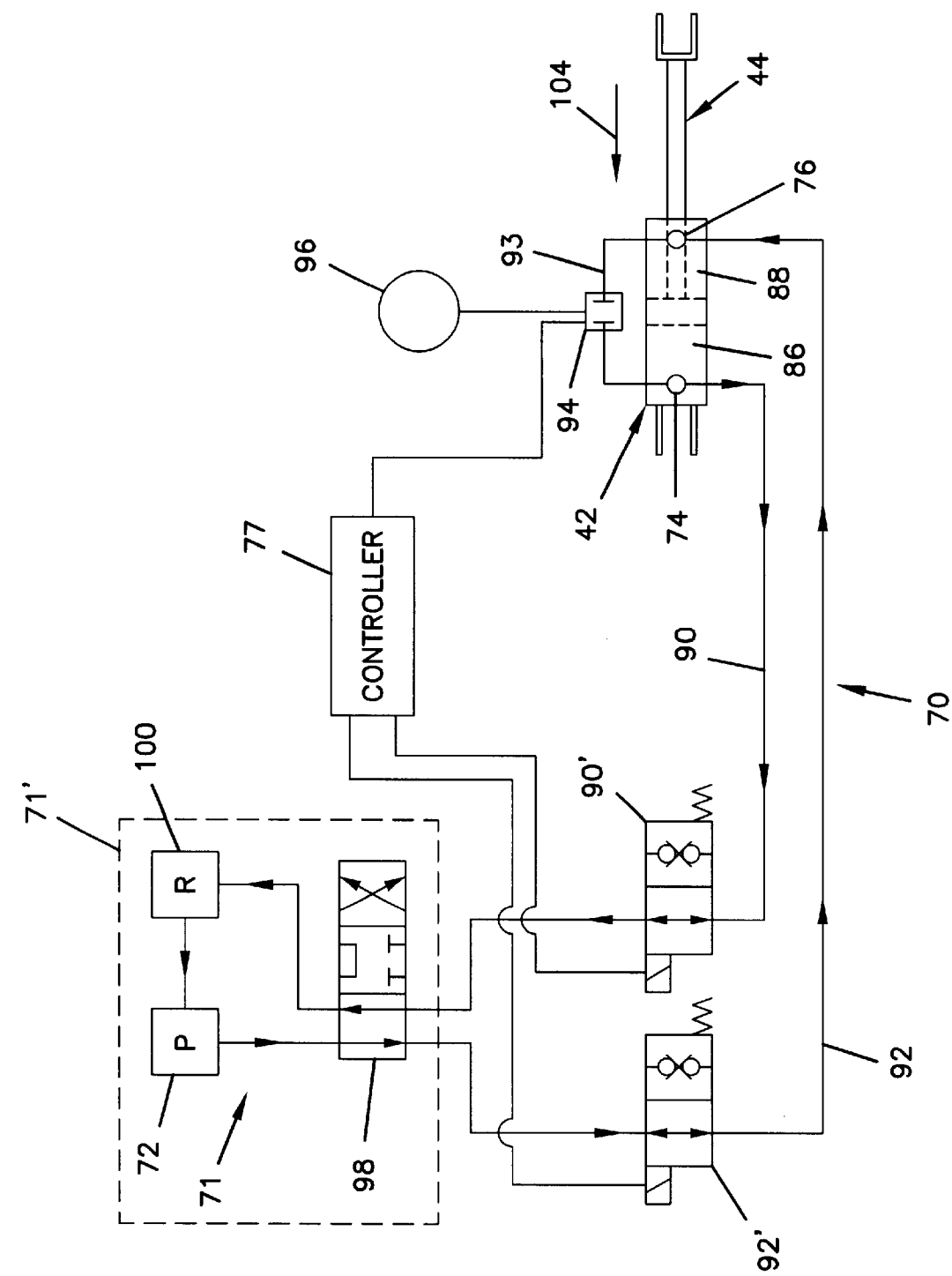
FIG. 8B illustrates the hydraulic control system of FIG. 8A in a fold mode.

FIG. 8B shows the hydraulic control system 70 in the fold mode. When the hydraulic control system 70 is in the fold mode, the main valve 98 directs flow from the pump 72 through the second flow line 92 toward the second chamber 88 of the hydraulic cylinder 42. The pressurized fluid entering the second chamber 88 causes the hydraulic cylinder 42 to retract (i.e., the piston structure 44 slides in a leftward direction within the cylinder portion 46 as indicated by arrow 104). As the hydraulic cylinder 42 retracts, hydraulic fluid within the first chamber 86 is forced through the first flow line 90 toward the reservoir 100. During the retraction process, the blocking valve 94 prevents fluid from flowing through the bypass line 93. The retraction of the hydraulic cylinder 42 causes the inner and outer boom parts 30 and 32 of its corresponding boom 26 to pivot from the extended orientation of FIG. 1 toward the folded orientation of FIG. 2A.

Figure 8C:
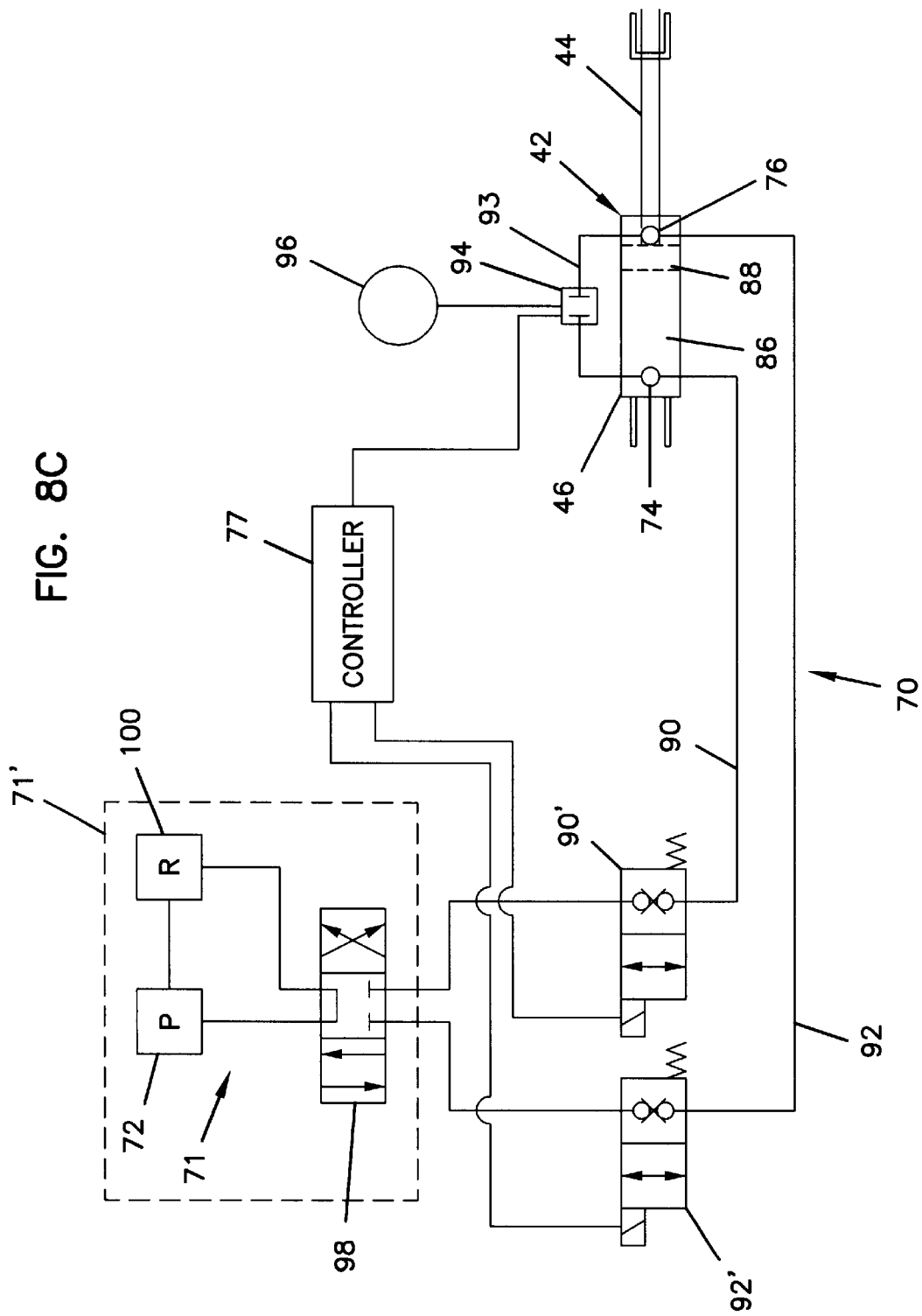
FIG. 8C illustrates the hydraulic control system of FIG. 8A in a neutral mode.

FIG. 8C shows the hydraulic control system 70 operating in a neutral mode. In the neutral mode, the main valve 98 blocks fluid communication between the pump 72 and the first and second flow lines 90 and 92, and also blocks fluid communication between the reservoir 100 and the first and second flow lines 90 and 92. Additionally, when the control system 70 is in the neutral mode, the blocking valve 94 is in a normally open position in which fluid flow is permitted through the bypass flow line 93, and the bypass flow line 93 is in fluid communication with the accumulator 96. Further, valves 90' and 92' block flow through the first and second flow lines 90 and 92.

When conducting spraying operations, the hydraulic control system 70 of the sprayer 20 is preferably operated in the neutral mode of FIG. 8C. If during spraying operations, the outer boom part 32 of one of the booms 26 contacts an obstacle, the outer part 32 of the boom experiences a break-away condition (i.e., the outer part 32 is caused to pivot backward) thereby forcing the hydraulic cylinder 42 to retract.

Figure 8D:
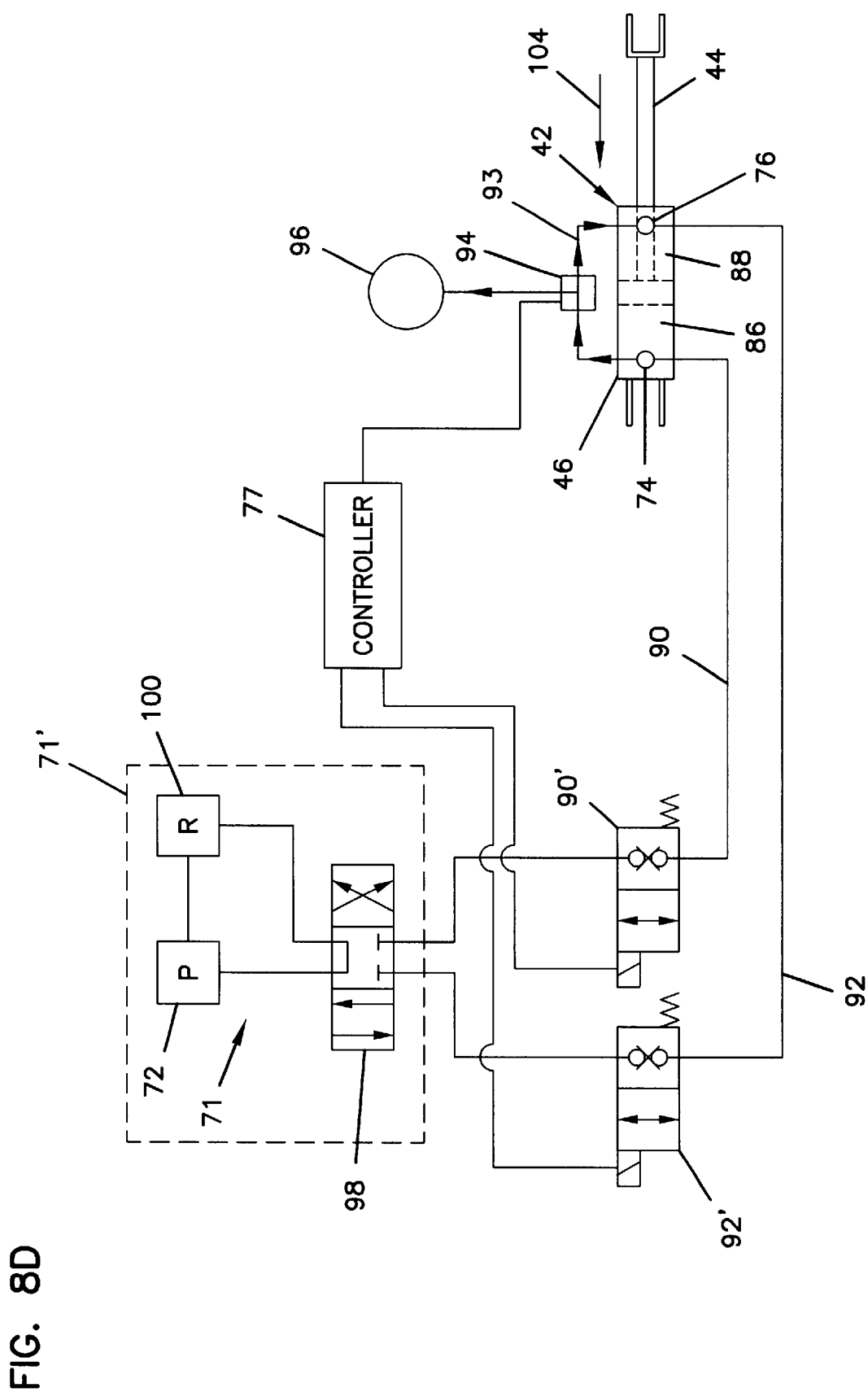
FIG. 8D illustrates the hydraulic control system of FIG. 8A during a break-away condition.

FIG. 8D shows the hydraulic control system 70 in a neutral mode with the hydraulic cylinder 42 in the process of being retracted because its corresponding boom is experiencing a break-away condition. As the hydraulic cylinder 42 retracts, hydraulic fluid is forced to flow through the bypass flow line 93 from the first chamber 86 toward the second chamber 88. Because the piston structure 44 displaces a larger volume of hydraulic fluid from the first chamber 86 than the volume of hydraulic fluid that can be received in the second chamber 88, excess displaced hydraulic fluid flows toward the accumulator 96. The bypass flow line 93 and the accumulator 96 allow the piston structure 44 to slide relative to the cylinder portion 46 to accommodate the pivoting movement of the boom 26 in response to contact with the obstacle. Absent such structure, the hydraulic cylinder 42 would be hydraulically locked in place such that pivotal movement between the inner and outer boom parts 30 and 32 of the corresponding boom 26 would be inhibited.

Figure 8E:
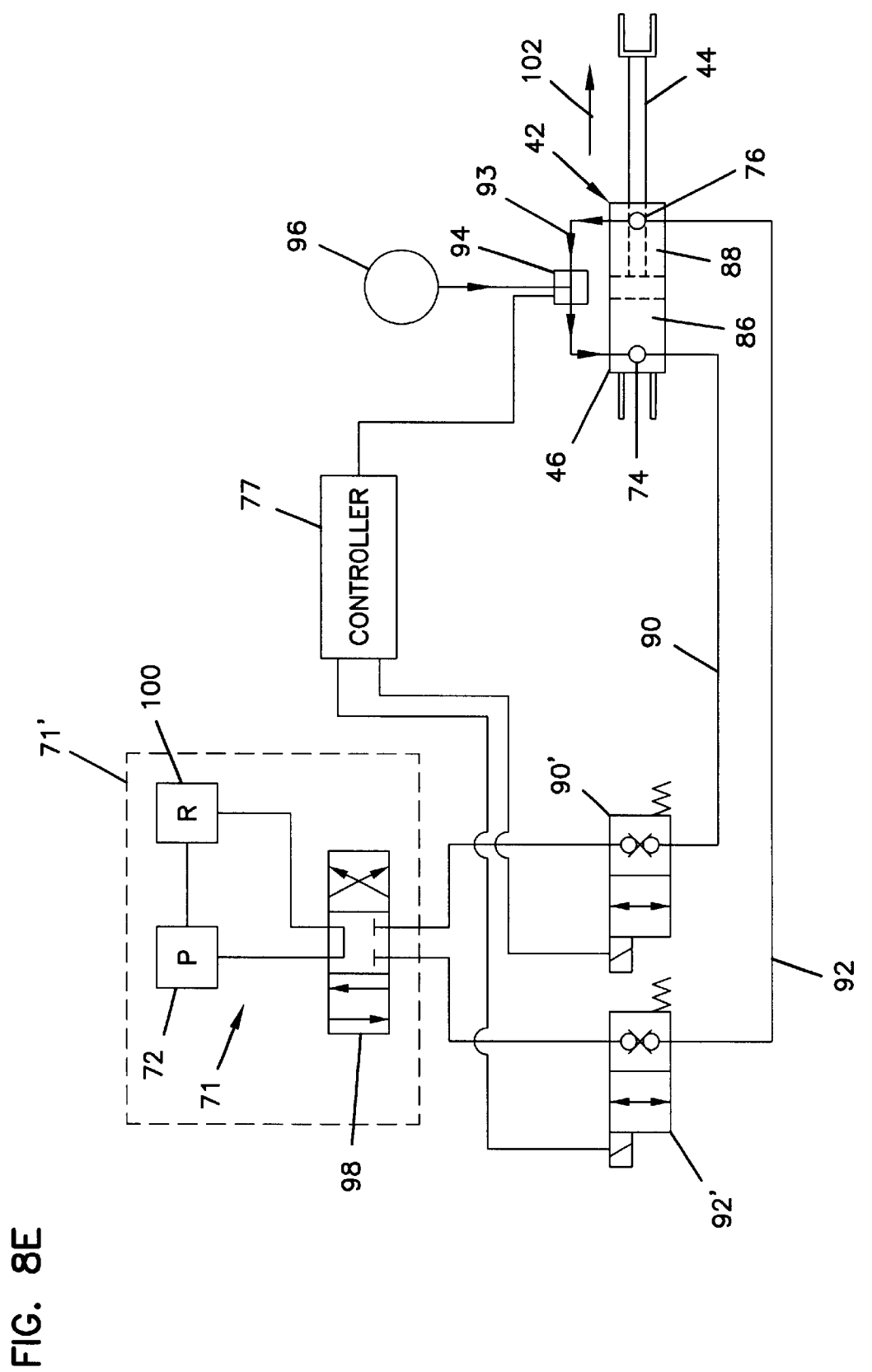
FIG. 8E illustrates the hydraulic control system of FIG. 8A returning from the break-away condition.

After the obstacle has been bypassed, the weight of the outer boom part 32 causes the outer boom part 32 to move via gravity in a direction from the folded orientation toward the extended orientation. As the boom 26 moves toward the extended orientation, the pivotal movement of the boom 26 causes the hydraulic cylinder 42 to extend as shown in FIG. 8E by arrow 102. The extension of the hydraulic cylinder 42 causes hydraulic fluid within the second chamber 88 to be forced through the bypass flow line 93 back toward the first chamber 86. Additionally, the stored hydraulic fluid within the accumulator 96 also flows back toward the first chamber 86.

Figure 9A:
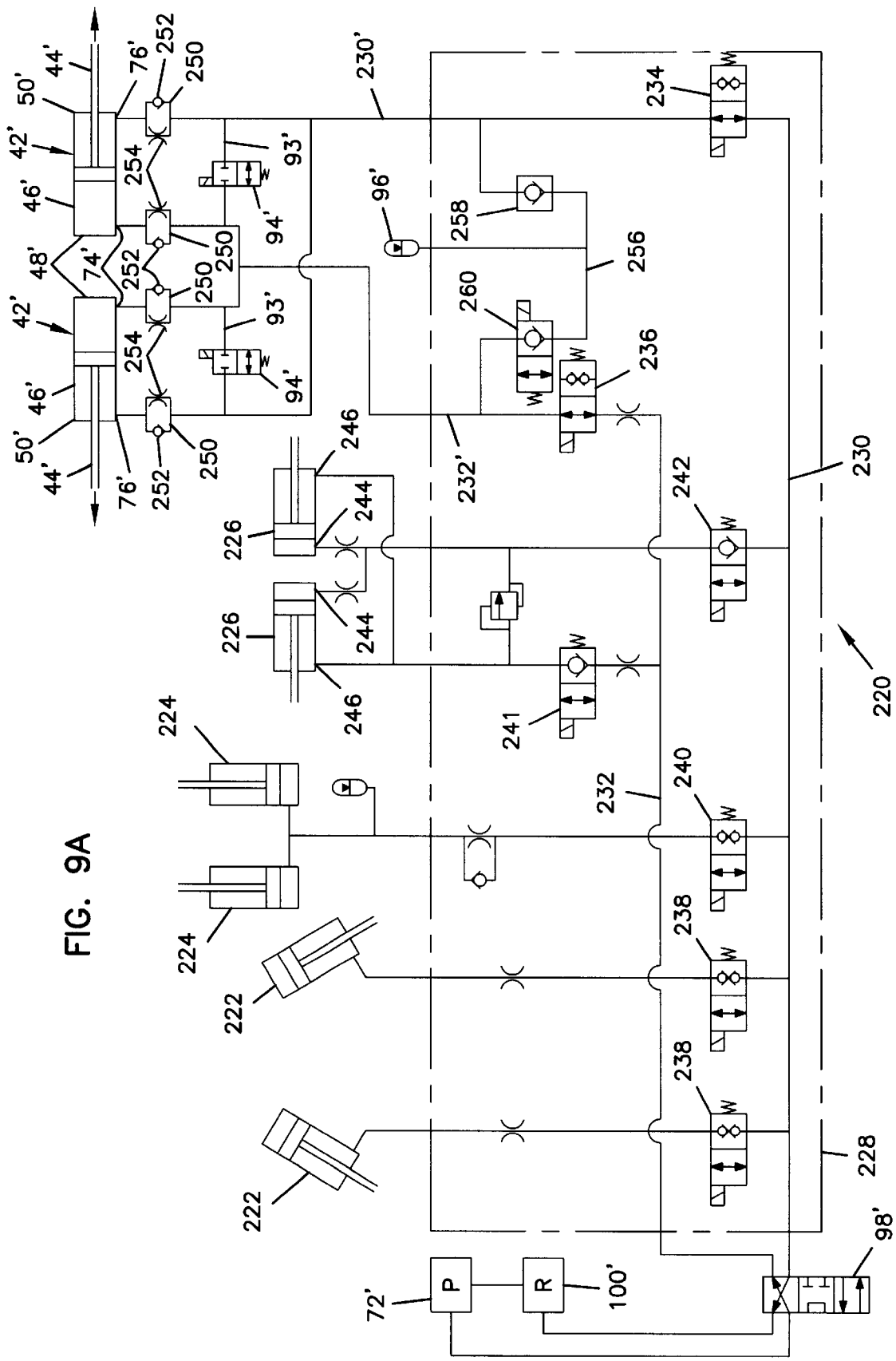
FIG. 9A illustrates a detailed hydraulic control system suitable for use with the agricultural sprayer of FIG. 1; the hydraulic control system is shown in an extend mode.
Figure 9B:
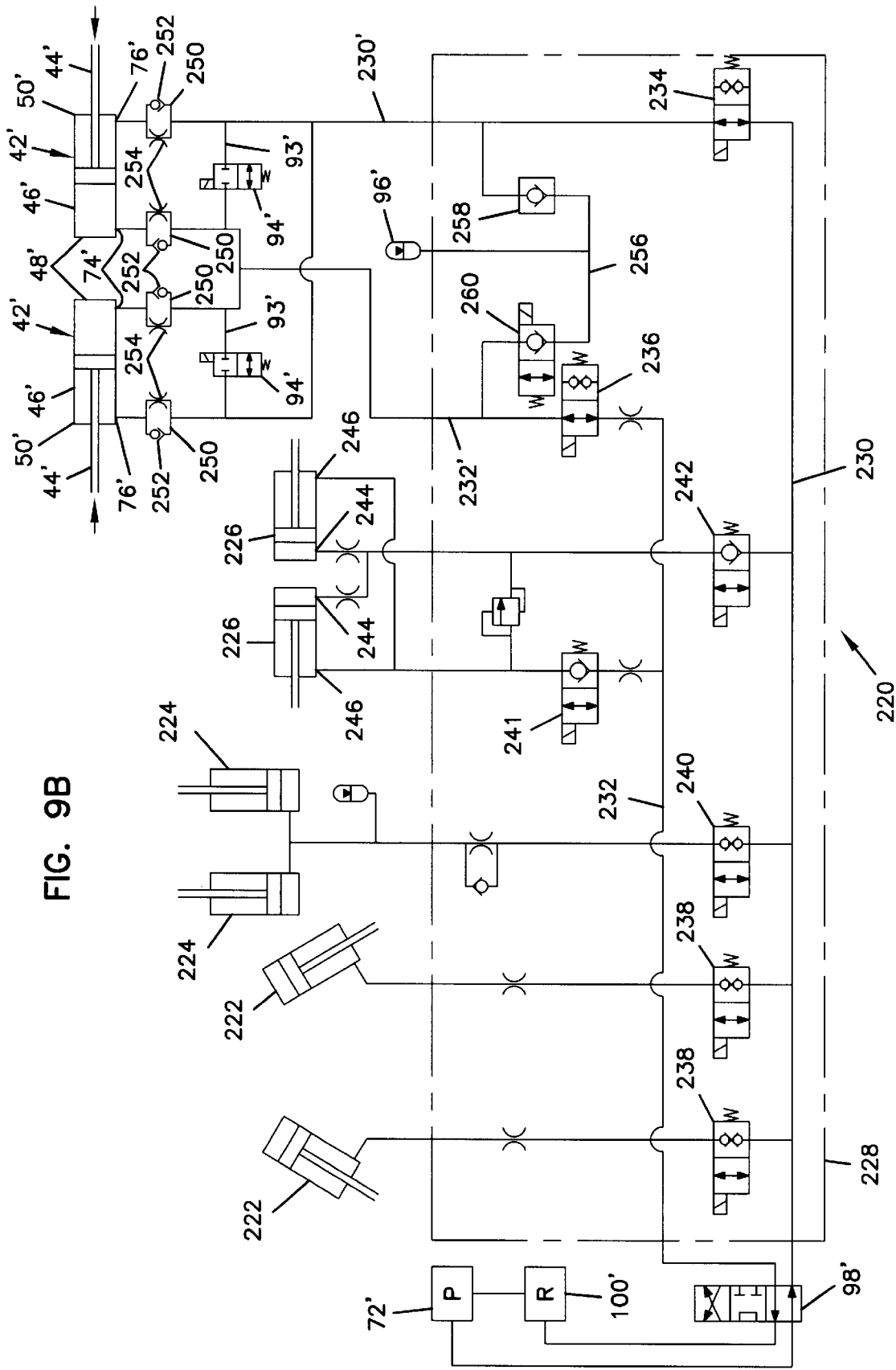
FIG. 9B illustrates the hydraulic control system of FIG. 9A in a fold mode.
Figure 9C:
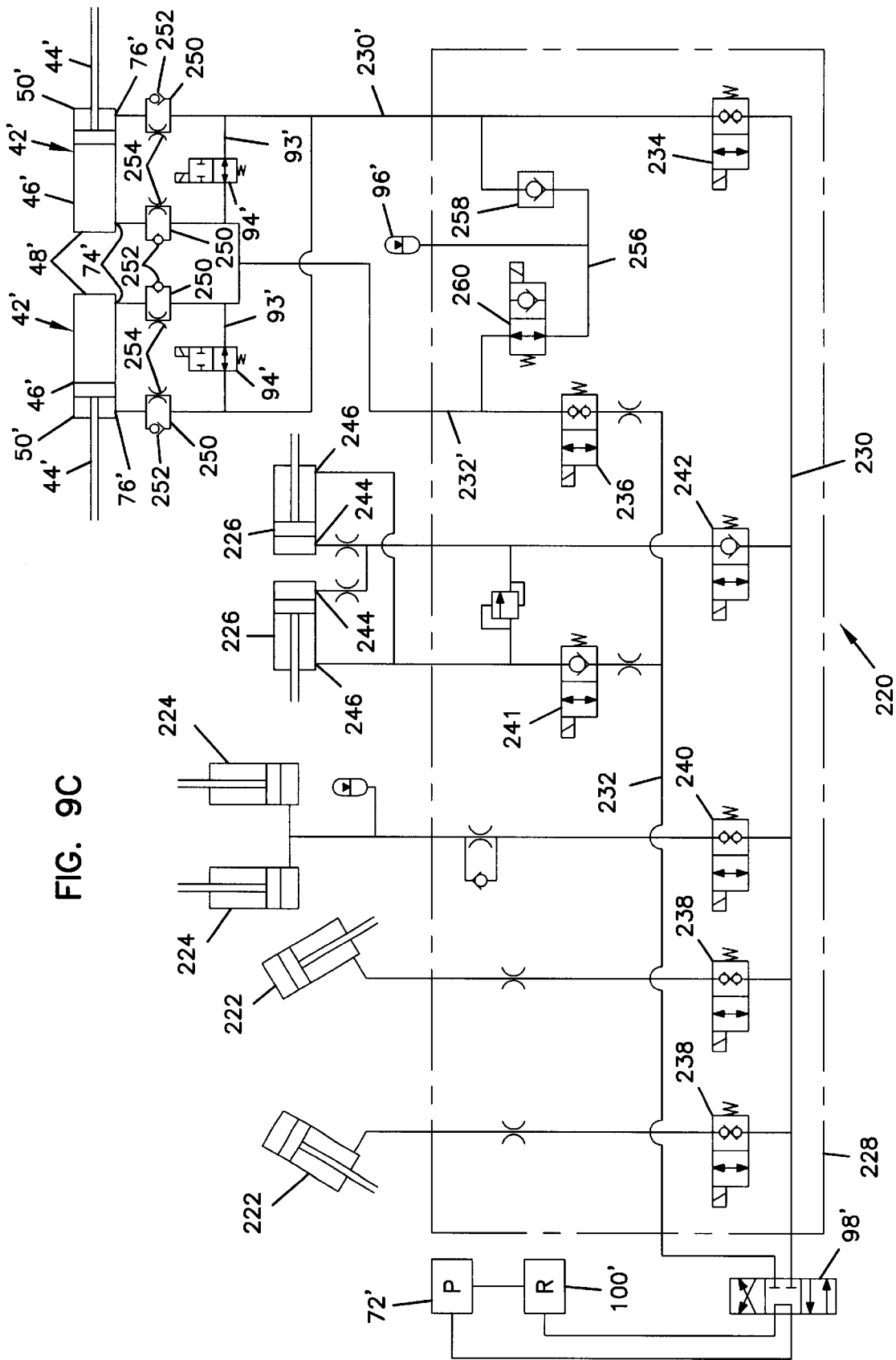
FIG. 9C illustrates the hydraulic control system of FIG. 9A in a neutral mode.

FIGS. 9A–9C illustrate a more detailed control system 220 suitable for use with the sprayer 20 of FIG. 1. The control system 220 includes two hydraulic cylinders 222 for tilting the booms 26 of the sprayer 20, two hydraulic cylinders 224 for vertically raising or lowering the booms 26 to adjust the clearance height of the booms 26, a pair of hydraulic cylinders 226 for pivoting the booms 26 about the inner pivot locations 36, and a pair of hydraulic cylinders 42' for pivoting the booms 26 at the intermediate pivot location 34. It will be appreciated that the hydraulic cylinders 42' have the same configuration as the hydraulic cylinder 42 shown in FIGS. 8A–8E. For example, the hydraulic cylinders 42' each include a piston structure 44' reciprocally mounted within a cylinder portion 46'. The hydraulic cylinders 42' also include first ports 74' positioned adjacent to blind ends 48' of the cylinder portions 46', and second ports 76' positioned adjacent to open ends 50' of the cylinder portions 46'.

Hydraulic pressure for operating the hydraulic cylinders 222, 224, 226 and 42' is preferably provided by a pump 72' that draws hydraulic fluid from a reservoir 100'. A hydraulic control block 228 is provided for controlling hydraulic fluid flow toward and away from the hydraulic cylinders 222, 224, 226 and 42'. A main valve 98' controls fluid flow between the hydraulic control block 228 and the pump 72', and also between the hydraulic control block 228 and the reservoir 100'. As previously described with respect to the embodiment of FIGS. 8A–8E, the pump 70', the reservoir 100' and the main valve 98' are commonly part of a vehicle (e.g., a tractor) used to move the sprayer.

The hydraulic control block 228 defines a first passage 230 for providing fluid communication between the main valve 98' and the second ports 76' of the hydraulic cylinders 42'. The hydraulic control block 228 also defines a second passage 232 for providing fluid communication between the main valve 98' and the first ports 74' of the hydraulic cylinders 42'. The hydraulic control block 228 further includes a number of valves for controlling hydraulic fluid flow through the various passages defined by the block 228. For example, valve 234 is provided for opening and closing the first passage 230, and valve 236 is provided for opening and closing the second passage 232. Portions 230', 232' of the first and second passages 230, 232 are defined between the valves 234, 236 and the hydraulic cylinders 42'. Additionally, a pair of valves 238 are provided for opening and closing fluid communication between the first passage 230 and the cylinders 222, and valve 240 is provided for opening and closing fluid communication between the first passage 230 and the hydraulic cylinders 224. Further, hydraulic flow to the hydraulic cylinders 226 is controlled by valves 241 and 242. Valve 242 functions to open and close fluid communication between the first passage 230 and blind end ports 244 of the hydraulic cylinders 226, and valve 241 functions to open and close fluid communication between the second passage 232 and open end ports 246 of the hydraulic cylinders 226.

Referring still to FIGS. 9A–9C, the control system 220 includes restrictor valves 250 (e.g., one-way orifice plates such as those sold by Eaton Corporation of Cleveland, Ohio) positioned at or mounted within the first ports 74' and the second ports 76' of the hydraulic cylinders 42'. Each of the restrictor valves 250 is shown schematically as a one-way valve 252 arranged in parallel with an orifice 254. The restrictor valves 250 allow restricted flow to enter the hydraulic cylinders 42' through the ports 74', and also allow restricted flow to exit the hydraulic cylinders 42' through the ports 76'. By contrast, the restrictor valves 250 allow substantially unrestricted flow to enter the hydraulic cylinders 42' through the ports 76' and exit the cylinders 42' through the ports 74'.

The control system 220 further includes two bypass lines 93' that provide fluid communication between the first and second flow passages 230 and 232. Blocking valves 94' are provided for opening and closing the bypass flow lines 93'. An accumulator flow line 256 also extends between the first and second flow passages 230 and 232 of the hydraulic control block 228. An accumulator 96' is in fluid communication with the flow line 256. A one-way valve 258 prevents fluid from flowing from the first flow line 230 through the bypass line 256 to the accumulator 96'. A solenoid valve 260 is provided for opening and closing fluid communication between the second flow passage 232 and the accumulator 96'.

FIG. 9A shows the control system 220 in an extend mode in which the hydraulic cylinders 42' are being used to pivot the inner and outer boom parts 30 and 32 of the sprayer 20 from the folded orientation of FIG. 2A toward the extended orientation of FIG. 1. With the control system 220 in the extend mode, the pump 72' causes hydraulic fluid to flow through second flow passage 232 and enter the hydraulic cylinders 42' through the first ports 74'. As the hydraulic fluid enters the hydraulic cylinders 42' through the first ports 74', the hydraulic cylinders 42' extend causing the inner and outer boom parts 30 and 32 of the booms 26 to unfold. Concurrently, hydraulic fluid is forced out the second ports 76' and flows through the first flow passage 230 toward the reservoir 100'. While in the extend mode, the blocking valves 94' are closed such that flow is not permitted through the bypass lines 93'. Similarly, valve 260 is also closed such that flow is not permitted through the accumulator flow line 256. To allow the hydraulic fluid to circulate through the first and second flow passages 230 and 232, both of solenoid valves 234 and 236 are open.

FIG. 9B shows the control system 220 in a fold mode in which the inner and outer boom parts 30 and 32 of the booms 26 are pivoted by the hydraulic cylinders 42' from the extended orientation of FIG. 1 toward the folded orientation of FIG. 2A. When the control system 220 is in the fold mode, the pump 72' causes hydraulic fluid to flow through the first passage 230 and enter the hydraulic cylinders 42' through the second ports 76'. As the fluid enters the second ports 76', it forces the hydraulic cylinders 42' to retract. The retraction of the hydraulic cylinders 42' causes the inner and outer boom parts 30 and 32 of the booms 26 to pivot from the extended orientation of FIG. 1 toward the folded orientation of FIG. 2A. The retraction of the hydraulic cylinders 42' also causes hydraulic fluid to be forced out of the hydraulic cylinders 42' through the first ports 74'. The hydraulic fluid forced through the first ports 74' flows through the second passage 232 toward the reservoir 100'. While the control system 220 is operating in the fold mode, the blocking valves 94' are closed such that no flow is permitted through the bypass lines 93', the solenoid valve 260 is closed such that no flow is permitted through the accumulator flow line 256, and the solenoid valves 234 and 236 are open such that flow is permitted through the first and second flow passages 230 and 232.

FIG. 9C illustrates the control system 220 in a neutral mode. The control system 220 is preferably set to the neutral mode when the booms 26 are extended and spray is being applied to a field. When the control system 220 is in the neutral mode, the main valve 98' preferably blocks fluid communication between the tractor pump 72' and the hydraulic control block 228, and also preferably blocks fluid communication between the reservoir 100' and the hydraulic control block 228. Concurrently, the blocking valves 94' are preferably open such that hydraulic fluid is permitted to flow through the bypass flow lines 93' between the first and the second flow passages 230 and 232. Additionally, the solenoid valve 260 is preferably open such that hydraulic fluid is permitted to flow through the accumulator flow line 256 between the portion 232' of the second flow passage 232 and the accumulator 96'. Further, the valves 234 and 236 are closed such that hydraulic fluid is trapped in a break-away circuit (at least partially defined by the accumulator line 256, the portion 232' of the second passage 232, and the bypass lines 93') configured for allowing any differential volume generated during a break-away to be absorbed into the accumulator 96'.

If an obstruction is contacted by the outer boom part 32 of one of the booms 26 while the control system 220 is in the neutral mode, its corresponding hydraulic cylinder 42' is forced to retract as the outer boom part 32 pivots backward. The retraction of the hydraulic cylinder 42' causes hydraulic fluid to exit the cylinder portion 46' through the first port 74'. As the hydraulic fluid is forced out the first port 74', hydraulic fluid in the break-away circuit is forced through the corresponding bypass flow line 93' and back into the cylinder portion 46' through the second port 76'. Hydraulic fluid in the break-away circuit is also forced from the portion 232' of the second passage 232, through the accumulator flow line 256 and into the accumulator 96'. After the obstacle has been passed, gravity causes the outer boom part 32 to pivot back toward the extended orientation of FIG. 1. Pressure within the accumulator 96' also forces the outer boom part 32 to pivot back toward the extended orientation. As the outer boom part 32 pivots back to the extended orientation, its corresponding hydraulic cylinder 42' extends causing hydraulic fluid to exit the cylinder portion 46' through the second port 76'. The hydraulic fluid exiting the second port 76' causes hydraulic fluid in the system to flow through the bypass line 93' and back into the cylinder portion 46' through the first port 74'. Concurrently, hydraulic fluid stored in the accumulator 96' also flows back toward the first port 74' of the hydraulic cylinder 42'. The restrictor valves 250 restrict the flow entering the cylinder portion 46' through first port 74' and exiting the cylinder portion 46' through the second port 76'. This restriction of flow cushions movement of the outer boom part 32 to prevent the outer boom part from slamming back to the extended orientation.

With regard to the foregoing description, it is intended that the specification and depicted embodiments be considered exemplary only, with a true scope and spirit of the invention being indicated by the broad meaning of the following claims.

What is claimed is:

1. An agricultural sprayer that travels in a forward direction during normal spraying operations, the sprayer comprising:

a tank for holding a product desired to be sprayed;

a boom on which are mounted a plurality of sprayers for dispensing the product from the tank, the boom including an inner piece positioned adjacent to the tank and an outer piece positioned away from the tank, the inner and outer pieces being foldably connected to one another at a pivot region which allows the inner and outer pieces to be pivoted between a folded orientation and an extended orientation;

a hydraulic cylinder for hydraulically pivoting the inner and outer pieces of the boom between the folded orientation and the extended orientation, the hydraulic cylinder including a piston structure connected to one of the inner and outer pieces of the boom and a cylinder portion connected to the other of the inner and outer pieces of the boom, the piston structure of the hydraulic cylinder including a piston head connected to a piston rod, and the cylinder portion defining a first port located on a first side of the piston head and a second port located on a second side of the piston head;

a pressure source for providing hydraulic pressure to the hydraulic cylinder for pivoting the inner and outer pieces of the boom between the extended and folded orientations by causing the hydraulic cylinder to extend or retract;

a hydraulic control system for controlling the operation of the hydraulic cylinder, the hydraulic control system being operable in an unfold mode in which hydraulic pressure from the pressure source causes the hydraulic cylinder to pivot the outer piece of the boom from the folded orientation to the extended orientation and a fold mode in which hydraulic pressure from the pressure source causes the hydraulic cylinder to pivot the outer piece of the boom from the extended orientation to the folded orientation, the hydraulic control system also being operable in a neutral mode in which the pressure source is prevented from extending or retracting the hydraulic cylinder; and the hydraulic control system including a hydraulic circuit relative axial movement between the piston structure and cylinder portion of the hydraulic having a flow line that provides fluid communication between the first and second ports of the cylinder portion when the hydraulic control system is operating in the neutral mode;

the hydraulic control system including an accumulator for: a) accumulating hydraulic fluid under pressure when the outer boom piece collides with an obstruction and is pivoted rearwardly from the extended orientation toward the folded orientation; and b) forcing the pressurized hydraulic fluid from the accumulator back toward the hydraulic cylinder after the obstruction has been bypassed;

the hydraulic control system including at least one valve for: a) blocking the flow line between the first and second ports and also blocking fluid communication between the accumulator and the hydraulic cylinder when the hydraulic control system is in either the fold mode or the unfold mode; and b) opening the flow line between the first and second ports and opening fluid communication between the hydraulic cylinder and the accumulator when the hydraulic control system is in the neutral mode;

wherein the accumulator automatically causes the outer boom piece to return to the extended orientation after the obstacle has been bypassed by providing stored hydraulic pressure to the hydraulic cylinder which forces the hydraulic cylinder to pivot the outer boom piece in the forward direction to the extended orientation.

2. A folding boom for an agricultural sprayer, the boom comprising:

a first boom piece pivotally connected to a second boom piece at a pivot region which allows the first and second pieces to be pivoted between a folded orientation and an extended orientation, a hydraulic cylinder for hydraulically pivoting the first boom piece relative to the second boom piece between the folded orientation and the extended orientation, the hydraulic cylinder including a cylinder portion in which a piston structure is mounted, the cylinder portion and the piston structure being configured to slide axially relative to one another when the first boom piece is pivoted relative to the second boom piece; and an accumulator in fluid communication with the cylinder portion for: a accumulating hydraulic fluid under pressure when the first boom piece collides with an obstruction and is pivoted in a rearward direction from the extended orientation toward the folded orientation; and b) forcing the pressurized hydraulic fluid from the accumulator toward the hydraulic cylinder after the obstruction has been bypassed, wherein the accumulator automatically causes the first boom piece to return to the extended orientation after the obstacle has been bypassed by providing stored hydraulic pressure to the hydraulic cylinder which forces the hydraulic cylinder to pivot the first boom piece in a forward direction to the extended orientation.

3. The folding boom of claim 2, further comprising a main pressure source for moving the first boom piece between the extended and folded orientations, and a valve for blocking fluid communication between the accumulator and the cylinder portion when the first boom member is being hydraulically moved by pressure from the main pressure source.

4. A method for providing a break-away function in a foldable agricultural spraying boom, the boom including an outer boom piece pivotally connected to an inner boom piece, the boom also including a hydraulic cylinder for hydraulically pivoting the outer boom piece relative to the inner boom piece between folded and extended positions, the hydraulic cylinder including a piston structure mounted within a cylinder portion, the piston structure and the cylinder portion being configured to slide axially relative to one another when the outer boom piece is pivoted between the folded and extended positions, the spraying boom including a hydraulic control system for controlling the operation of the hydraulic cylinder, the hydraulic control system being operable in an unfold mode in which hydraulic pressure from a pressure source causes the hydraulic cylinder to move the outer boom piece from the folded position toward the extended position, the hydraulic control system also being operable in a fold mode in which hydraulic pressure from the pressure source causes the hydraulic cylinder to move the outer boom piece from the extended position toward the folded position, and the hydraulic control system also being operable in a neutral mode in which the pressure source is prevented from extending or retracting the hydraulic cylinder, the method comprising:

moving the boom in a forward direction with the outer boom piece in the extended position;

contacting the outer boom piece with an obstruction while the boom is moved in the forward direction such that a force is applied to the outer boom piece that pushes the outer boom piece rearwardly from the extended position toward the folded position;

transferring the force from the outer boom piece to the hydraulic cylinder;

sliding the piston structure and the cylinder portion axially relative to one another in response to the force transferred to the hydraulic cylinder through the outer boom piece, wherein the relative axial movement of the piston structure and the cylinder portion allows the outer boom piece to pivot rearwardly toward the folded position until the obstruction is bypassed;

moving the outer boom piece forwardly to the extended position after the obstruction has been bypassed by sliding the piston structure and the cylinder portion relative to one another; and operating the hydraulic control system exclusively in the neutral mode as the piston structure and the cylinder portion slide relative to one another to cause the outer boom piece to move forwardly to the extended position after the obstruction has been bypassed.

5. The method of claim 4, wherein an interior chamber of the cylinder portion is in fluid communication with an accumulator that accumulates hydraulic fluid as the piston structure and the cylinder portion are moved relative to one another during impact with the obstacle.

6. The method of claim 4, wherein the piston structure includes a piston head that divides the cylinder portion into first and second chambers and a piston rod connected to the piston head, wherein the piston rod extends through the first chamber, and wherein hydraulic fluid flows between the first and second chambers as the piston structure and the cylinder portion are moved relative to one another during impact with the obstacle.

7. The method of claim 6, wherein as the piston structure and the cylinder portion move relative to one another, more hydraulic fluid is displaced from the second chamber than is received in the first chamber.

8. The method of claim 7, further comprising an accumulator that accumulates a volume of hydraulic fluid equal to a difference between the volume of hydraulic fluid displaced from the second chamber and the volume of hydraulic fluid received in the first chamber.

9. The method of claim 10, wherein the outer boom piece is returned to the extended position through the use of fluid pressure stored in an accumulator.

10. A method for providing a break-away function in an agricultural spraying boom, the boom including a boom piece pivotally moveable between folded and extended positions, the boom also including a hydraulic cylinder for hydraulically pivoting the boom piece between the folded and extended positions, the hydraulic cylinder including a piston structure mounted within a cylinder portion, the piston structure and the cylinder portion being configured to slide axially relative to one another when the boom piece is pivoted between the folded and extended positions, the spraying boom including a hydraulic control system for controlling the operation of the hydraulic cylinder, the hydraulic control system being operable in a first mode in which hydraulic pressure from a main pressure source causes the hydraulic cylinder to move the boom piece forwardly from the folded position toward the extended position, the hydraulic control system also being operable in a second mode in which hydraulic pressure from the main pressure source causes the hydraulic cylinder to move the boom piece rearwardly from the extended position toward the folded position, the method comprising:

moving the boom piece forwardly with the boom piece in the extended position;

contacting the boom piece with an obstruction as the boom piece is moved forwardly such that a force is applied to the boom piece that pushes the boom piece rearwardly from the extended position toward the folded position;

transferring the force from the boom piece to the hydraulic cylinder;

sliding the piston structure and the cylinder portion axially relative to one another in response to the force transferred to the hydraulic cylinder through the boom piece, wherein the relative axial movement of the piston structure and the cylinder portion allows the boom piece to pivot rearwardly toward the folded position until the obstruction is bypassed; and returning the boom piece forwardly to the extended position after the obstruction has been bypassed by sliding the piston structure and the cylinder portion relative to one another without using pressure from the main pressure source.

11. The method of claim 10, wherein an interior chamber of the cylinder portion is in fluid communication with an accumulator that accumulates hydraulic fluid as the piston structure and the cylinder portion are moved relative to one another during impact with the obstacle.

12. The method of claim 10, wherein the piston structure includes a piston head that divides the cylinder portion into first and second chambers and a piston rod connected to the piston head, wherein the piston rod extends through the first chamber, and wherein hydraulic fluid flows between the first and second chambers as the piston structure and the cylinder portion are moved relative to one another during impact with the obstacle.

13. The method of claim 12, wherein as the piston structure and the cylinder portion move relative to one another, more hydraulic fluid is displaced from the second chamber than is received in the first chamber.

14. The method of claim 13, further comprising an accumulator that accumulates a volume of hydraulic fluid equal to a difference between the volume of hydraulic fluid displaced from the second chamber and the volume of hydraulic fluid received in the first chamber.

15. The method of claim 10, wherein the boom piece is returned to the extended position through the use of fluid pressure stored in an accumulator.

16. The method of claim 10, wherein gravity assists in returning the boom piece to the extended position.

* * * * *